No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 1.
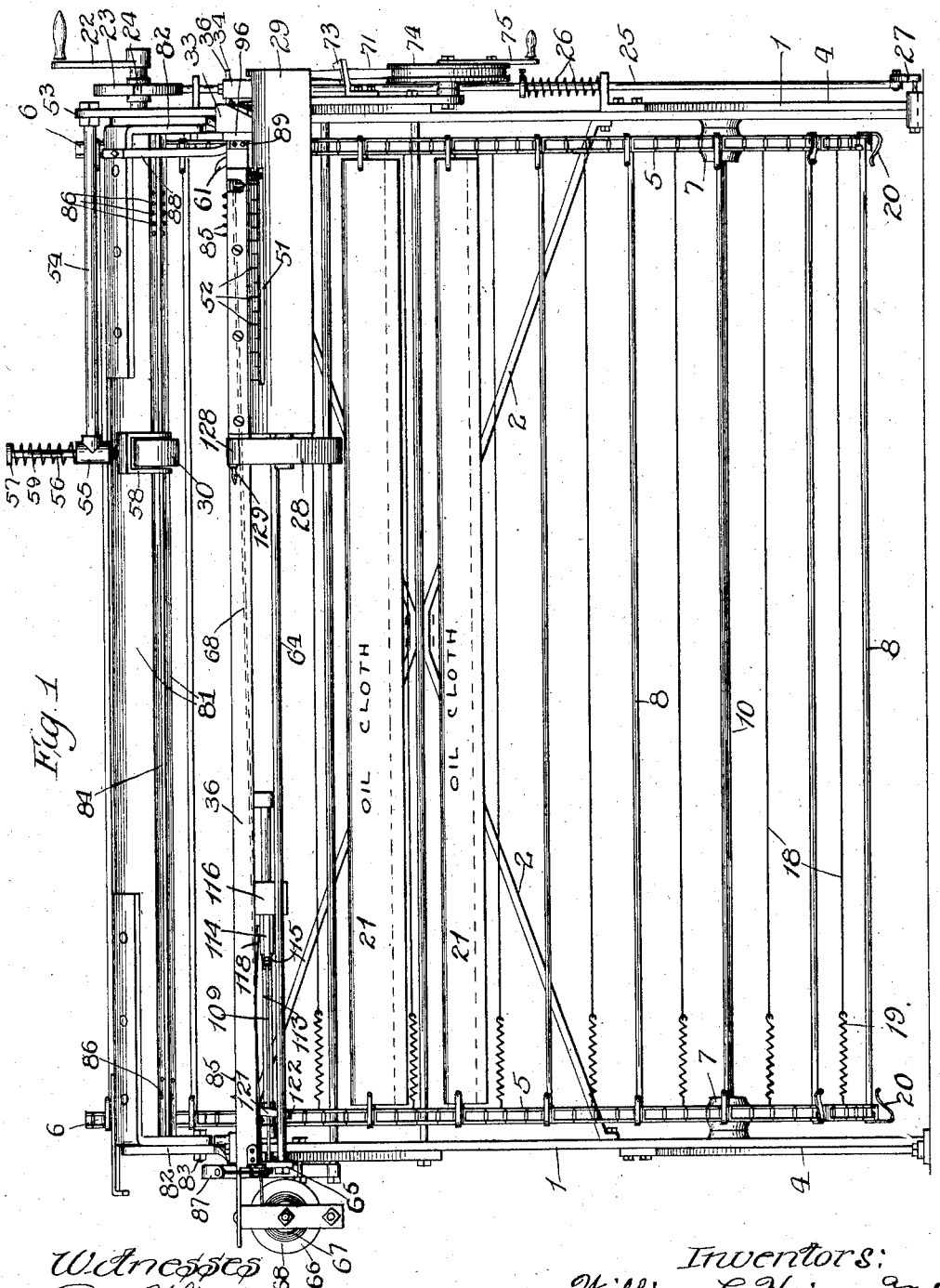

No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 2.
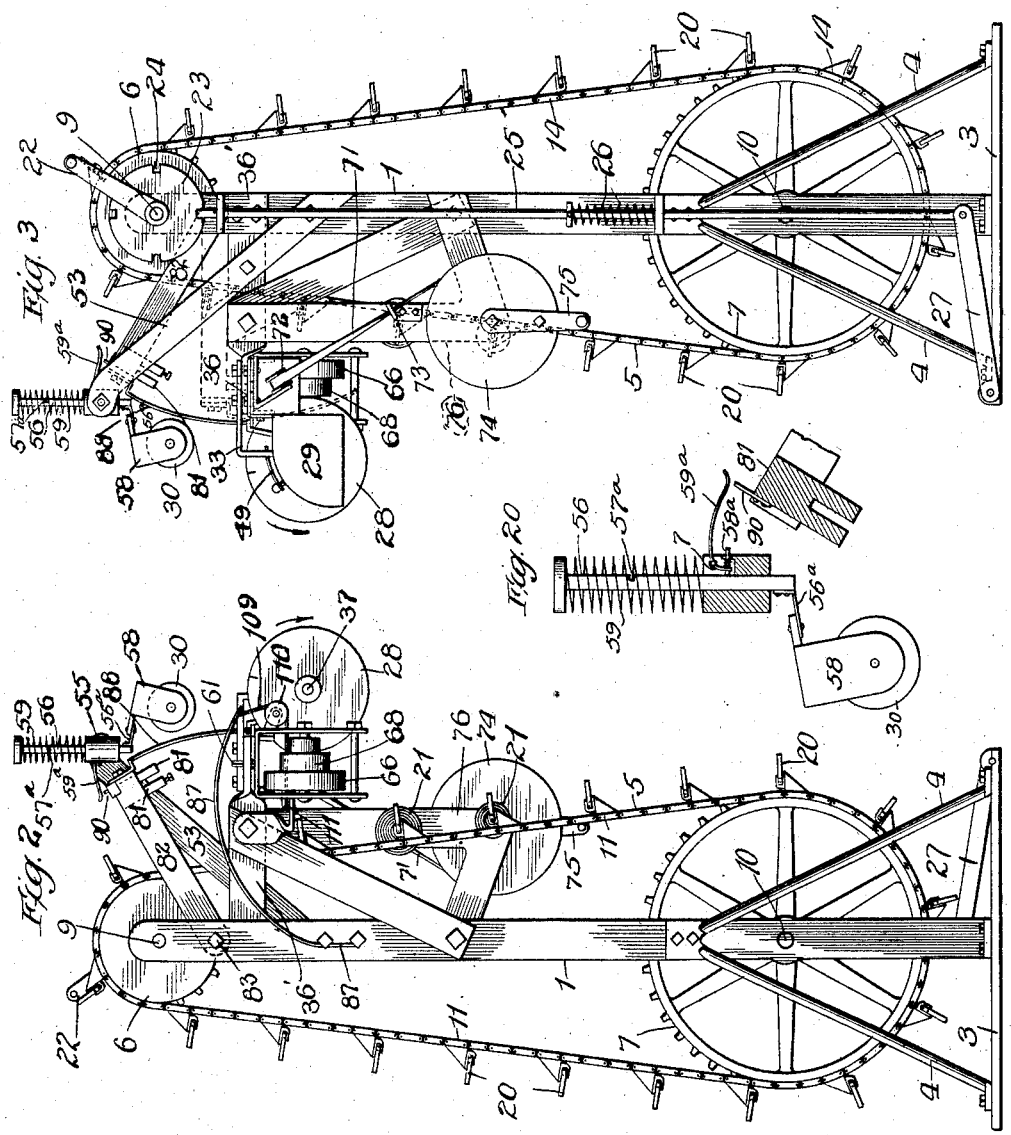

No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 3.
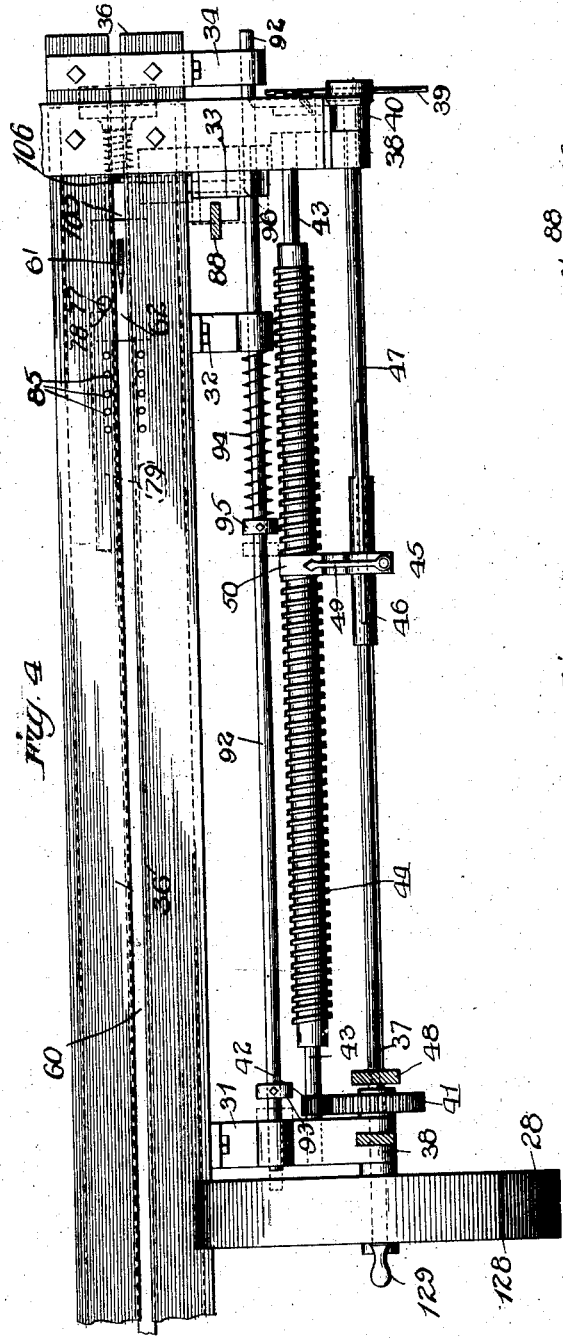

No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 4.
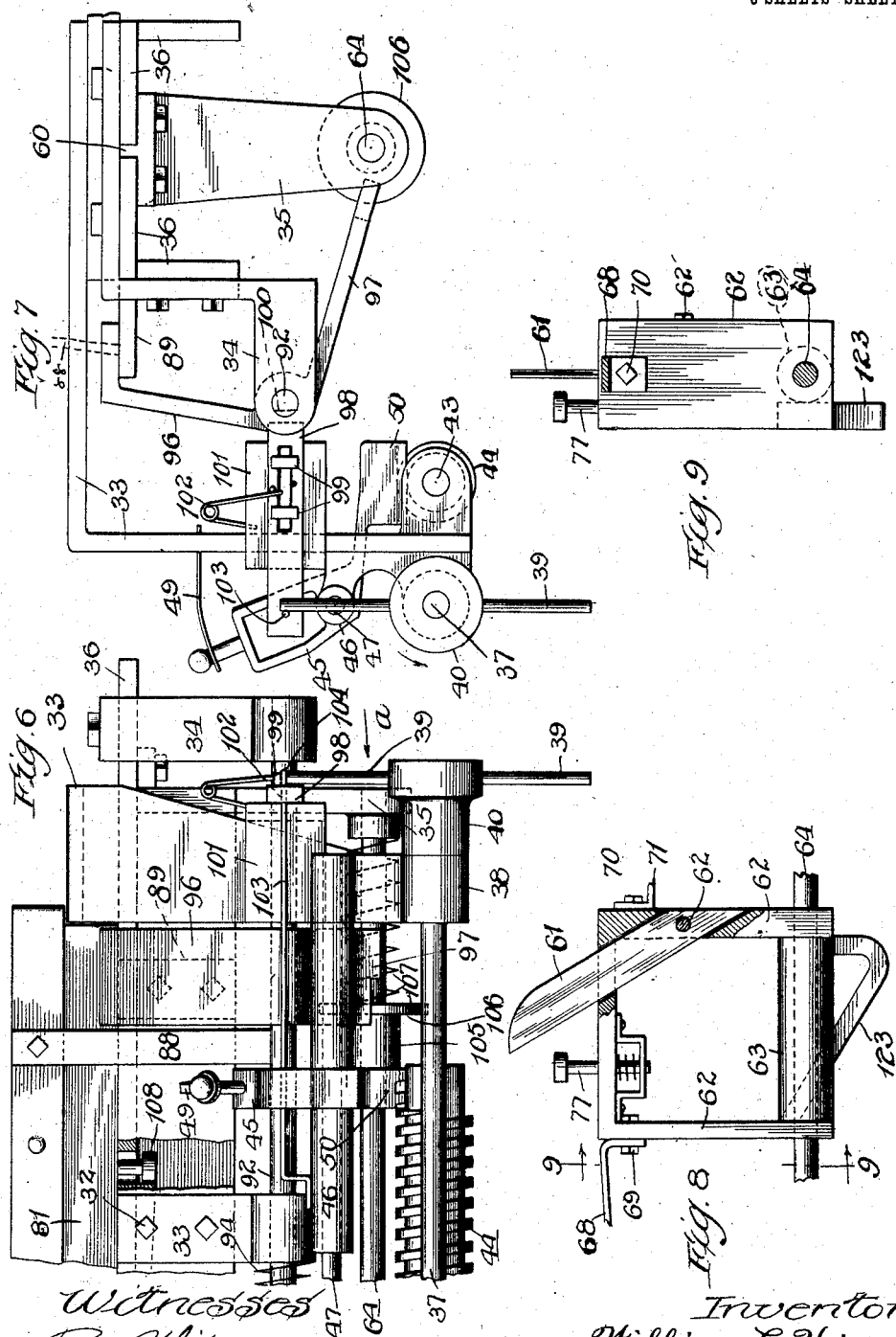

No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 5.
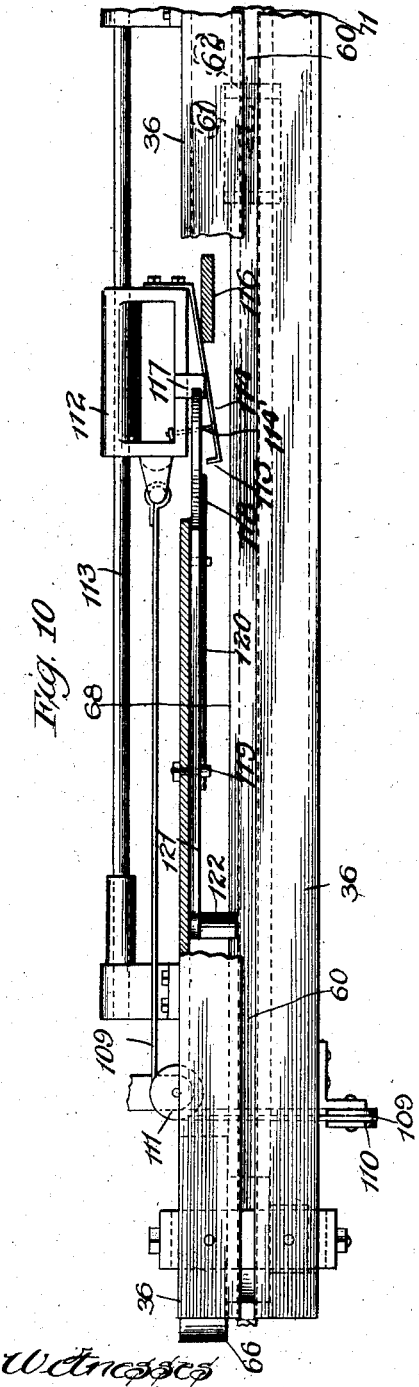
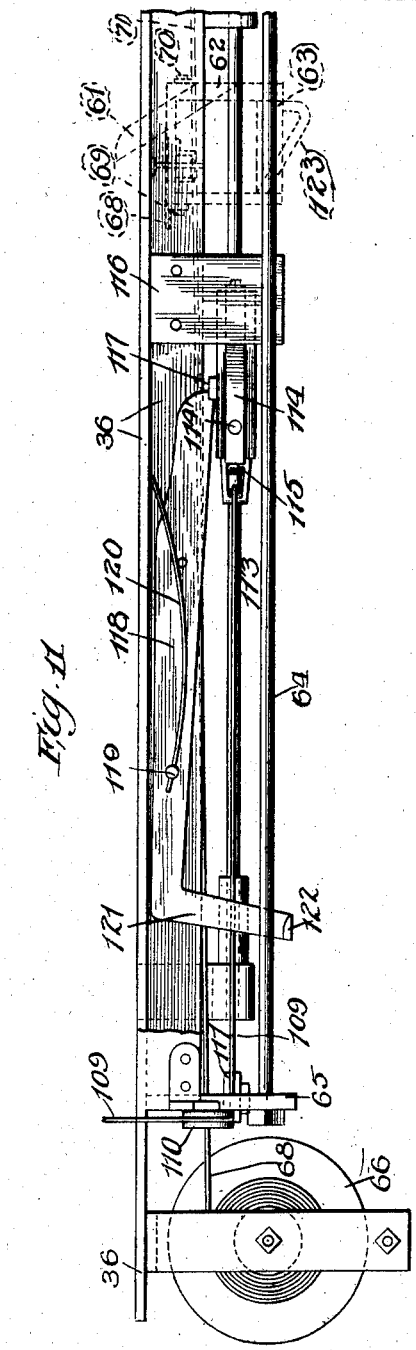

No. 866,277. PATENTED SEPT. 17, 1907.
W. C. HEINEN & W. F. DAU.
MACHINE FOR DISPLAYING, MEASURING, AND CUTTING OFF OIL CLOTH.
APPLICATION FILED APR. 29, 1907.
6 SHEETS—SHEET 6.
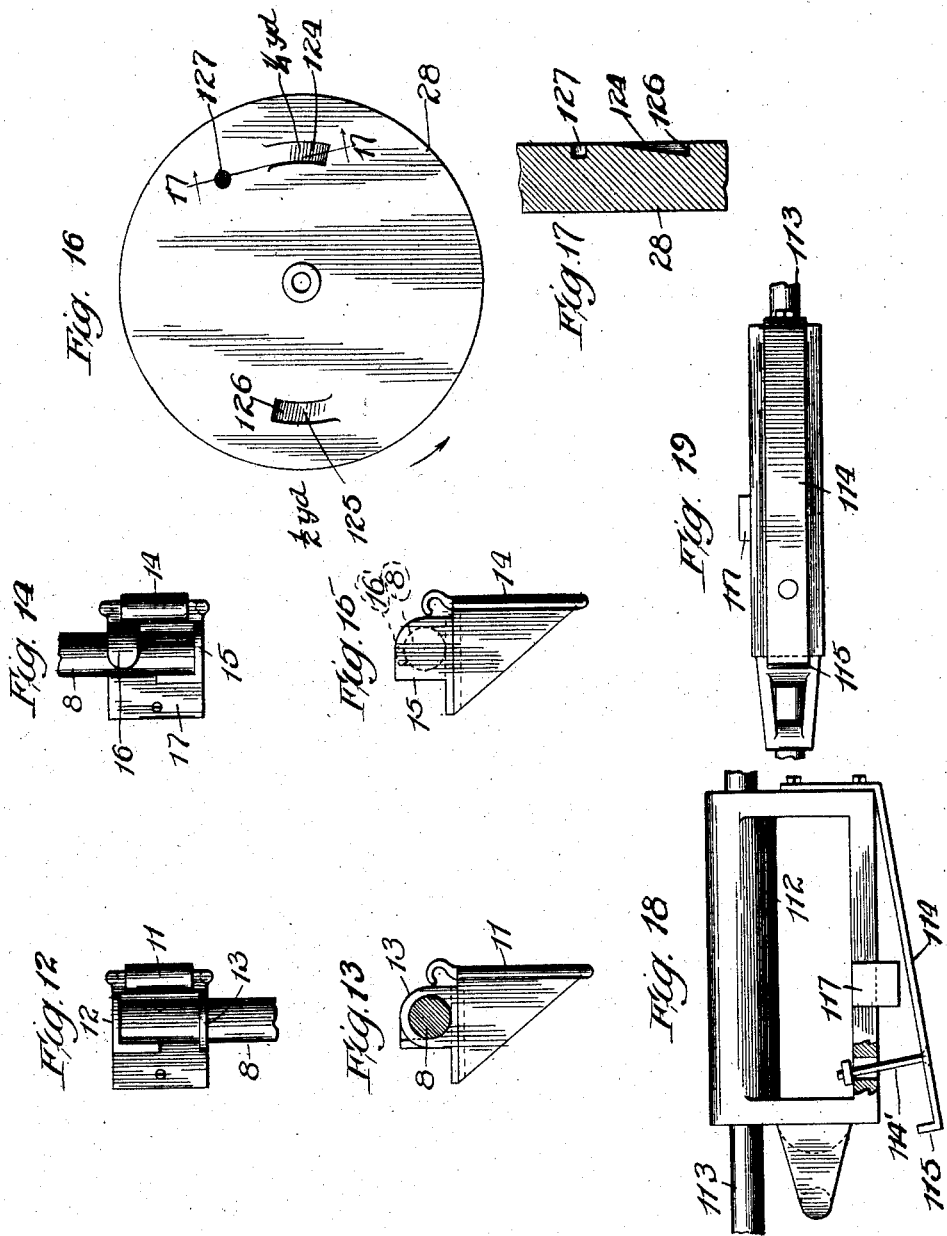

UNITED STATES PATENT OFFICE.

WILLIAM C. HEINEN AND WILLIAM F. DAU, OF WHITTEMORE, IOWA.

MACHINE FOR DISPLAYING, MEASURING, AND CUTTING OFF OIL-CLOTH.

No. 866,277.

Specification of Letters Patent.

Patented Sept. 17, 1907.

Application filed April 29, 1907. Serial No. 370,901.

*To all whom it may concern:*

Be it known that we, WILLIAM C. HEINEN and WILLIAM F. DAU, citizens of the United States, both residing at Whittemore, in the county of Kossuth and State of Iowa, have invented certain new and useful Improvements in a Machine for Displaying, Measuring, and Cutting Off Oil-Cloth, of which the following is a specification.

This invention relates to a combined display and cutting device for the use of merchants in selling oil-cloth from rolls.

The objects of the invention are, to provide a machine of this kind, which will hold a large number of rolls of cloth, yet occupy but small floor space; to provide mechanism which will measure and cut off pieces of the cloth much more quickly and accurately than could be done by the use of rule and scissors; and without any handling of the rolls of cloth; and which may be easily operated by one person.

Generally stated, the invention consists in an endless carrier of novel construction, for holding and carrying a large number of rolls of cloth; further, in novel mechanism for measuring out the cloth; and further, in novel means for cutting the cloth; and further, in novel means for holding the cloth upon the cutting-bed while it is being cut; and further, in the novel co-action and coöperation of the several instrumentalities, whereby the action of the machine is rendered semi-automatic.

We wish it understood that the mechanism illustrated in the accompanying drawings is only one of many possible embodiments that fall within the scope of this invention.

In the said drawings:—Figure 1 is a front elevation of a machine constructed in accordance with the invention, and showing two rolls of oil-cloth carried thereon; Fig. 2 is a left-end elevation, and Fig. 3 is a right-end elevation, of the same; Fig. 4 is a plan view of the measuring mechanism and the knife, the latter ready for cutting; Fig. 5 is a front elevation of the same, a part of the cutting-table being broken away; Fig. 6 is a further enlarged detail view of the clamp-bar, tripping mechanism and certain other parts, just after the clamp-bar has fallen upon the cutting-table; Fig. 7 is an end view of certain of the parts shown in Fig. 6, looking in the direction of arrow *a;* Fig. 8 is a detail view in elevation of the knife-frame and knife; Fig. 9 is a section on line 9—9 of Fig. 8, viewed in the direction of the arrows; Fig. 10 is a plan detail view of a part of the clamp-bar spring-trip mechanism; Fig. 11 is a front elevation of the parts shown in Fig. 10, showing the knife-frame in dotted lines; Figs. 12 and 13 are detail views of one of the special chain-links at one side of the machine; Figs. 14 and 15 are similar views of a special link at the opposite side of the machine; Fig. 16 is an enlarged view of the right-hand (inner) face of the measuring wheel; Fig. 17 is a section on line 17—17 of Fig. 16; Fig. 18 is a detail enlarged from Fig. 10; Fig. 19 is a front side view of the part shown in Fig. 18; and Fig. 20 is a detail view showing the detent for holding the presser-roller in depressed position.

Like numerals of reference, refer to corresponding parts throughout the different views of the drawings.

The frame of the machine comprises standards 1 at the ends thereof, connected by braces 2, and various brackets referred to hereinafter. The standards are provided with bases 3 and foot-braces 4. The roll-holding mechanism consists of a pair of endless sprocket belts 5, carried by upper and lower sprocket wheels 6, 7 at the respective ends of the machine, and a series of horizontal rods 8, carried by and detachable from said belts. The upper sprockets 6 are connected by a common shaft 9, and the lower sprockets, by a common shaft 10. At equal intervals the belts 5 are provided with special links, (shown in detail in Figs. 12 to 15, inclusive) for receiving the ends of said rods 8 which support the rolls of oil-cloth. One of the belts is provided with links of the type shown in Figs. 12 and 13; 11 indicating the link proper and 12—13 indicating outstanding ears thereon. The inner ear 13 has an opening through which the rod 8 is inserted, the outer ear serving as a stop. The other belt 5 is provided with links 14 of the type shown in Figs. 14 and 15; the outer ear 15 forming a stop, and the inner ears being replaced by a spring clip 16. The web 17 provides a support for the end of the rod. When the rolls of oil-cloth are received by the merchant he takes out the sticks upon which they are wound, inserts the rods 8 instead, and places the rods in position on the sprocket-belts. When doing this, the belts are spread slightly apart, and to prevent falling of other rolls from the belts, said belts are connected halfway between the special links by a series of spaced wires 18, provided with tension-springs 19. Each of the special links is provided with a spring finger 20 (see Fig. 1) that presses upon the outer surface of the roll of oil-cloth 21 and prevents accidental unrolling thereof.

A large number of pieces of oil-cloth may be shown without rotating the sprockets. The upper sprocket-shaft 9 is provided with a hand crank 22 for turning same and shifting the rolls; also with a locking-wheel 23, Fig. 3 having one or more notches 24. A latch-rod 25 is pressed up by a spring 26 against said wheel, and is connected with, in the present instance, a foot-lever 27. Depression of said lever will disengage the rod 25 from a notch of wheel 23 and permit rotation of shaft 9.

Mounted on the front of the machine at a convenient height are the measuring-wheel 28, an automatic mechanism inclosed by a housing 29, and a presser roller 30. Said mechanism is supported by bearing-brackets 31, 32, 33, 34 and 35, Figs. 4, 5, & 6 secured to one or both of a pair of longitudinal, parallel angle-bars 36, hereinafter termed the cutting-table. Said bars 36 are supported by brackets 36¹. The measuring-wheel 28 is fixed upon a horizontal shaft 37, having bearings 38 and carrying at its end opposite said wheel a pair of opposite radial pins 39, fixed in a hub 40. Also fixed upon shaft 37 is a gear wheel 41 which drives a gear or pinion 42 fixed upon a parallel shaft 43, having a screw 44 thereon.

45 is an indicator carriage, having a sleeve 46 mounted slidably on a rod 47. The carriage is rockable upon rod 47 as a pivot. Its upper end bears a pointer 49; its opposite end is provided with a "half-nut" 50 (Figs. 6 and 7) adapted to engage and be driven by the thread of the rotative screw 44, and may be lifted from engagement with said screw by tilting the carriage 45 outwardly or forwardly. Normally, said carriage is at the extreme right, and does not engage the screw. When the housing 29 is in place, the pointer 49 projects through a slot 51 in the housing, which is provided with a scale 52 marked in inches and quarter-yards. A considerable number of revolutions of the measuring-wheel 28 are required to carry the pointer 49 from end to end of the scale 52, which is so graduated as to indicate the peripheral travel of the wheel 28 and, therefore, the length of the fabric that is drawn out over said wheel. When the measuring-wheel is turned in the direction of the arrow (Figs. 2, 3 and 16) the screw 44 will move the carriage 45 to the right; hence, as a preliminary to measuring out the cloth, the operator moves said carriage to the left until the pointer 49 registers with a figure on the scale indicating the desired length to be cut off, then he engages the half-nut 50 with the screw 44. The half-nut is made heavy so it counterbalances the upper part of the carriage and holds its engagement with the screw.

To provide for accurate feeding of the oil-cloth by the wheel 28, the presser-roller 30 is provided. Said roller is supported as follows:—An arm or bracket 53, bolted to one frame 1, rigidly supports a horizontal rod 54 Fig. 1 that holds at its end a sleeve 55. Slidably held by this sleeve 55 is a stem 56, having on its upper end a head 57 and on its lower end a yoke 58 in which the roller 30 is journaled, in vertical alinement with the measuring-wheel 28. On the stem 56 is an expansion-spring 59, which holds the roller 30 normally in raised position. The roller-yoke 58 is connected to the stem 56 through the medium of a flat spring 56ᵃ Fig. 20. The stem 56 is provided with a notch 57ᵃ, and mounted in the sleeve or block 55 is a spring-detent 58ᵃ, adapted to engage the notch 57ᵃ when the stem 56 has been depressed and thereby to hold the roller 30 down with yielding pressure upon the cloth and measuring-wheel. For disengaging the detent 58ᵃ, a lever 59ᵃ is provided, the same projecting rearwardly toward the clamp-bar 81, on which is mounted a plate 90, arranged to engage said lever 59ᵃ. When the clamp-bar 81 is raised to its inoperative position, said part 90 strikes and moves lever 59ᵃ, which retracts the detent 58ᵃ, and the spring 57ᵃ lifts up the stem, yoke, and roller 30.

The mechanism by which the piece of oil-cloth is severed from the roll will next be described. The two bars 36 Fig. 4 forming the cutting-table are spaced apart, thus forming a narrow slot 60 therebetween, through which the knife 61 reciprocates. The knife is shown in detail in Figs. 8 and 9, and in the machine in Figs. 1, 4 and 5. The cutting blade 61 is mounted on a frame 62, having a sleeve 63, slidably mounted on a guide-rod 64, held by brackets 35 Fig. 5, 65 Fig. 11. The blade 61 projects between and above the bars 36 of the table, and is inclined in the direction of its cutting movement, which is leftward. The knife-frame or carrier is actuated as to its cutting stroke, by a spring, and is drawn into initial cutting position by the operator. The casing 66 Figs. 1 & 2 contains the spring, which is like the well-known clock-spring and is therefore not shown in the drawings. Rotatively connected to said spring is a spool 67 Fig. 1, to the periphery of which is secured a strap 68 Figs. 1, 2, & 5, either of leather or sheet-metal. This strap is attached to the knife-frame at 69. Attached to said frame at 70, and extending in the opposite direction to the right-hand side of the machine, is a strap 71 Fig. 3, passing over a guide-pulley 72, through a guide 73, and on to a reel 74, provided with a hand-crank 75. The reel 74 is mounted on a bracket 76. By winding the strap upon this reel the knife is drawn into place ready for its cutting stroke. When it arrives at such position it is there held by a spring-pressed catch 77 Figs. 4, 5, & 8, mounted on the knife-frame 62, entering a hole 78 in one of the table-bars 36 (Fig. 5). Before entering said hole, the head of the catch 77 slides along a downwardly inclined surface 79 which gradually depresses it and forms a shoulder 80.

A device is provided for holding the cloth tight upon the cutting table while it is being cut, and said device is so mounted as to be out of the way when not in actual use, and is automatically lowered to operative position by mechanism now to be described. The member which drops upon and holds the cloth against movement is preferably in the form of a pair of boards or bars 81, Fig. 2 held horizontally above the cutting-table by a pair of rock-arms 82, pivoted at 83 on the respective frame-uprights 1. Said boards or bars, hereinafter denominated the clamp-bar, are spaced apart to provide a narrow slot 84 for passage of the knife 61. The table-bars 36 Fig. 4 are provided with upwardly projecting points 85, adapted to puncture the oil-cloth, and the opposed edges of the clamp-bar 81 are provided with corresponding holes 86 that cover said points when the clamp-bar is down. Said points positively prevent slipping of the cloth in any direction while it is being severed. Normally, the clamp-bar 81 is held in raised position, as in Figs. 1 & 2, by means of two springs 87 and 88. Spring 88 is carried by one of the rock-arms 82, and is held up by a shelf or bracket 89, most clearly shown in Fig. 7, and at the right side of the machine.

After the measuring-wheel 28 has been turned the predetermined distance, it brings into action mechanism which causes the clamp-board 81 to drop, automatically. As shown, this mechanism is constructed as described below, reference being had to Figs. 4, 5, 6 and 7. In Fig. 7, 89 is the bracket upon which the lower end of the spring support 88 rests to hold the clamp-bar 81 in elevated position. 92 is a longitudinal rod extending from the right-hand side of the machine, to a point close to the measuring-wheel 28 (Fig. 5), and having a short longitudinal movement, through its supporting brackets 31, 34. It is provided with a stop-collar 93. A spring 94, held between a second collar 95 and bracket 32, urges the rod 92 leftwardly.

Keyed upon this rod is a throw-off 96—97 (Figs. 6 and 7) adapted to push member 88 off from its support 89 when moved to the left. Its upper arm 96 rests slidably on the support 89 and its lower arm 97 extends rearwardly. Normally, the arm 96 is in the position shown in Fig. 5, just at the right of member 88, and is there held by a spring-pressed latch 98 Fig. 7. This latch 98 is slidable transversely on guide-studs 99, held by a bracket 101, and its inner end takes into a recess 100 (Fig. 6) in the rod 92 (see dotted lines in Fig. 7). The outer end of latch 98 is provided with a hole 102, located in alinement with a rod 103, carried by the sleeve 46 of the indicator carriage 45. When said carriage has nearly reached the end of its motion to the right, said rod 103 will pass through the hole in the latch 98 and will project as shown at 104 in Fig. 6, into the path of the revolving pins 39. The first of said pins that strikes the end 104 of said rod, will bend the rod outwardly and retract the latch 98, which will release the rod 92 and throw-off arm 96, which will be moved, by spring 94, to the left and will push the member 88 off from the bracket 89, thereby permitting the clamp-bar 81 to drop. The arm 96 is restored to normal position automatically by the movement to the right of the knife-frame 62, which travels upon the same rod 64. The knife-frame 62 acts through the intermediacy of a slidable sleeve 105, having a flange 106; said flange impinges upon arm 97, thereby moving arm 96. Sleeve 105 is urged to the left by a helical spring 107 (Fig. 6). As the pins 39 revolve, the spring 102 of latch 98 will permit said pins to pass the end 104 of rod 103 as long as said rod is in projected position. The fall of the clamp-bar 81 causes the release of the knife 61; to this end the clamp-bar is provided with a downwardly projecting stud 108, (see Fig. 6) positioned to strike upon and depress the catch-stud 77 of the knife-frame, thereby disengaging said catch from shoulder 80, whereupon the knife will be drawn with force and speed back to the left-hand end of its stroke, cutting through the oil-cloth as it goes.

Mechanism is provided (Figs. 10 and 11) whereby the setting of the knife-frame (by the operator) will automatically draw down the lifting-spring 87 which serves to elevate the clamp-bar 81 after a cutting operation. As seen in Fig. 2, a cord, chain or thong 109 is attached to the outer end of said spring 87, and passes around guide-pulleys 110 and 111 (see Fig. 10), its other end being attached to a slide 112, mounted on a guide-rod 113. This slide 112 carries a spring catch 114 having a shoulder 115, adapted to be engaged by the knife-frame 62 or a projection thereof when the latter is drawn to the right; thus drawing along with it the slide 112 and tensioning the spring 87. The knife-frame is enabled to pass the shoulder 115 by means of a fixed cam 116 Figs. 10 & 11, placed in the path of the spring 114; when the latter strikes said cam 116 it will be moved inwardly, thereby disengaging its shoulder 115 from the engaging part of the knife-frame. The slide 112 carries also a lug 117. For holding the slide in extreme position (and spring 87 under tension) a trip-lever 118 is provided, same being pivoted at 119 and pressed downwardly by a spring, as 120. This lever is provided with an angular arm 121 Fig. 11, having a lateral projection 122. When the slide 112 has been carried far enough, the trip-lever 118 drops behind lug 117 and holds the slide against the tension of spring 87. The knife-frame 62 is provided with a wiper 123 (full lines Fig. 8). When the knife-frame nears the end of its cutting stroke, the wiper 123 engages the projection 122 and trips the lever 118, which releases the slide 112. The spring 87 then rises, lifting up the clamp-bar 81 and pulling the slide 112 to initial position.

Referring now to Fig. 16, it will be observed that the inner face of the measuring-wheel 28 is provided with two inclined recesses 124 and 125 disposed diametrically opposite, and forming shoulders 126. A circular recess 127 is also provided, at the same radial distance from center as the others. Any one of these recesses may be entered by the stop-rod 92, seen in Figs. 4, 5 and 6, when said rod is moved to the left by its spring 94. 127 is the normal stop, 124 is the stop for one-quarter of a yard of the cloth, and 125 is the stop for one-half a yard of the cloth. The measuring-wheel 28 is exactly eighteen inches (half a yard) in circumference. The measuring-wheel is provided with a mark 128, and with a handle 129 for rotating it.

The operation of the machine is as follows:—The operator brings the roll selected to be cut, into proper position by turning the main crank 22. He sets the indicator with the pointer 49 at that point on the scale corresponding to the linear quantity of the cloth to be cut off. He brings the edge of the cloth even with the mark 128 upon the measuring-wheel. He pulls down the presser-roller 30 so that it rests upon the wheel 28. The roller will be held in that position by engagement of detent 58ª Fig. 20 with notch 57ª of rod 56. By turning the reel 74, he draws the knife 61 to the right. This movement disengages the lock-rod 92 from the measuring-wheel recess 127. This movement draws out the required length of cloth. The rotation of the screw 44 carries the pointer carriage 45 to the right. When rod 103 is projected through the hole 102 in latch 98, one of the revolving pins 39 strikes and bends said rod outward, retracting said latch. Said latch releases the rod 92 and throw-off arm 96, which is moved by spring 94 to the left and pushes member 88 off from bracket 89, thereby permitting the clamp-bar 81 to drop. The upper arm 96 of the throw-off is restored to normal position by flange 106 of sleeve 105 striking the lower arm 97 of the throw-off. When the stop-rod 92 is released, as aforesaid, its spring 94 throws it to the left, so that its left end enters one of the recesses 124 or 125 in the measuring wheel 28, stopping said wheel. When the clamp-bar 81 drops, its projection 108 depresses pin 77, releasing the knife-frame 62, which is drawn across the machine by strap 68 and spring in casing 66, cutting through the cloth, and tripping the slide 112 that holds down the clamp-bar elevating spring 87 by cord 109. Said spring, being released, lifts the clamp-bar 81 to the position shown in Fig. 2. In its upward motion it trips the detent lever 59ª, whereupon spring 59 raises the rod 56, yoke 58 and roller 30. The operator turns the measuring-wheel 28 backward until the stop-rod 92 engages the locking-hole 127 therein. Said wheel remains so locked until released by again operating crank 75 to draw the knife across the cutting-table. All parts of the machine are now in readiness for the next operation.

Having thus fully described our invention, what we claim as new, and desire to secure by Letters-Patent, is—

1. In a machine of the kind described, means for supporting a roll of cloth, means for measuring out the cloth from the roll, and a horizontally reciprocating spring-actuated knife for cutting the cloth.

2. In a machine of the kind described, means for supporting a roll of cloth, a cutting-table, a horizontally reciprocating knife, and a rising and falling, normally elevated clamp-bar for holding the cloth upon the table while the cloth is being cut said knife being mounted on a guide independently of said clamp-bar and being incapable of vertical movement.

3. In a machine of the kind described, a cutting-support, a normally elevated, rising and falling clamp-bar for holding the cloth upon said cutting-support, a spring for lifting said clamp-bar, a cutter for severing the cloth, and means actuated by the inoperative stroke of the cutter for withdrawing said spring from the clamp-bar.

4. In a machine of the kind described, a cutting-support, a normally elevated, rising and falling clamp-bar for holding the cloth upon said cutting-support, a spring for lifting said clamp-bar, a cutter for severing the cloth, means actuated by the inoperative stroke of the cutter for withdrawing said spring from the clamp-bar, and means actuated by the operative stroke of said cutter for releasing said spring.

5. In a machine of the kind described, a measuring-wheel, a moving indicator actuated by rotation of the measuring-wheel, a cutting-table, a rising and falling, normally elevated clamp-bar, and means actuated by final movement of said measuring-wheel for dropping said clamp-bar into operative position.

6. In a machine of the kind described, a measuring-wheel, a moving indicator actuated by rotation of the measuring-wheel, a cutting-table, a rising and falling, normally elevated clamp-bar, a fixed support and a movable support for said clamp-bar, and means actuated by the final movement of said measuring-wheel for disengaging said movable support from said fixed support for dropping said clamp-bar into operative position.

7. In a machine of the kind described, a measuring-wheel, an indicator-carriage actuated by rotation of said measuring-wheel, a cutting-table, a rising and falling, normally elevated clamp-bar, a fixed and a movable support for said clamp-bar, a throw-off for disengaging said fixed from said movable support, means actuated by final movement of said indicator-carriage and of said measuring-wheel for releasing said throw-off, and means for actuating said throw-off.

8. In a machine of the kind described, a measuring-wheel, a spring-actuated stop for arresting forward movement of said wheel, an indicator-carriage actuated by rotation of said measuring-wheel, a latch for holding said stop in inoperative position while cloth is being measured out, and means actuated by final movement of the measuring-wheel for releasing said latch from said wheel-stop.

9. In a machine of the kind described, a measuring-wheel, a spring-actuated stop for arresting forward movement of said wheel, an indicator-carriage actuated by rotation of said measuring-wheel, a latch for holding said stop in inoperative position while cloth is being measured out, and means actuated by final movement of the measuring-wheel and of the indicator-carriage for releasing said latch from said wheel-stop.

10. In a machine of the kind described, a cutting-support, provided with a knife-slot, a horizontally-reciprocating knife projecting through said slot, a coiled spring for actuating said knife, a spool axially connected to said spring, and a strap or cord connected to the knife-frame and adapted to be wound upon or unwound from said spool.

11. In a machine of the kind described, a cutting-support, provided with a knife-slot, a horizontally-reciprocating knife projecting through said slot, a coiled spring for actuating said knife, a spool axially connected to said spring, a strap or cord connected to the knife-frame and adapted to be wound upon or unwound from said spool, a second strap, connected to the knife-frame and extending in the opposite direction from the first strap, and a reel adapted to wind thereon said second strap whereby said knife may be moved into cutting position.

12. In a machine of the kind described, a cutting-support, provided with a knife-slot, a horizontally-reciprocating knife projecting through said slot, a coiled spring for actuating said knife, a spool axially connected to said spring, a strap or cord connected to the knife-frame and adapted to be wound upon or unwound from said spool, means for drawing said knife across the machine into cutting position, a catch for holding the knife in such position, a measuring-wheel, and means actuated by final movement of said measuring-wheel for unlatching the knife.

13. In a machine of the kind described, a cutting-support, provided with a knife-slot, a horizontally-reciprocating knife projecting through said slot, a coiled spring for actuating said knife, a spool axially connected to said spring, a strap or cord connected to the knife-frame and adapted to be wound upon or unwound from said spool, means for drawing said knife across the machine into cutting position, a catch for holding the knife in such position, a measuring-wheel, means actuated by final movement of said measuring-wheel for unlatching the knife, a lock for holding the measuring-wheel before the knife is moved to said position, and means, actuated by the final movement of the knife into said position for unlocking the measuring-wheel.

14. In a machine of the kind described, an endless carrier comprising a series of horizontal rods carried by a pair of link belts, in combination with a cutting-table provided with a slot for a knife, and a horizontally-reciprocating knife projecting through said slot and movable from edge to edge of the cloth.

15. In a machine of the kind described, an endless carrier comprising a series of horizontal rods carried by a pair of link belts, in combination with a cutting-table provided with a slot for a knife, a horizontally-reciprocating knife projecting through said slot and movable from edge to edge of the cloth, and a rising and falling, normally elevated clamp-bar adapted to hold the cloth upon said cutting-table while said knife is cutting the cloth.

16. In a machine of the kind described, a horizontal, rotative shaft provided with a screw thread, a second rotative shaft parallel with and geared to said screw-shaft, a measuring-wheel fixed upon said second shaft, a crank for rotating said measuring-wheel, an indicator-carriage engaging and actuated by said screw-shaft and being adapted to be disengaged from said screw-shaft, an indicator mounted on said carriage, and a scale traversed by said indicator, said scale indicating the peripheral movement of said measuring-wheel.

17. In a machine of the kind described, a horizontal, rotative shaft provided with a screw thread, a second rotative shaft parallel with and geared to said screw-shaft, a measuring-wheel fixed upon said second shaft, said measuring-wheel being adapted to draw out a length of cloth from a roll by direct contact with the cloth, said wheel being provided with a recess adapted to be engaged by a stop-rod, a longitudinally movable stop-rod adapted to arrest the forward motion of said wheel at a certain point, a spring for actuating said stop-rod, a latch for holding the stop-rod in inoperative position, an indicator-carriage actuated by rotation of said screw-shaft and provided with an indicator, a scale traversed by said indicator, and automatic means for unlatching said stop-rod when said indicator has moved a predetermined distance.

WILLIAM C. HEINEN.
WILLIAM F. DAU.

Witnesses:
ALBERT E. LIEN,
HENRY GEELAN.